May 14, 1963
R. FORSTER
3,089,505
SLIDE TYPE MIXING VALVE WITH INTERCHANGEABLE
INLET AND OUTLET CONNECTIONS
Filed July 10, 1959
3 Sheets-Sheet 1
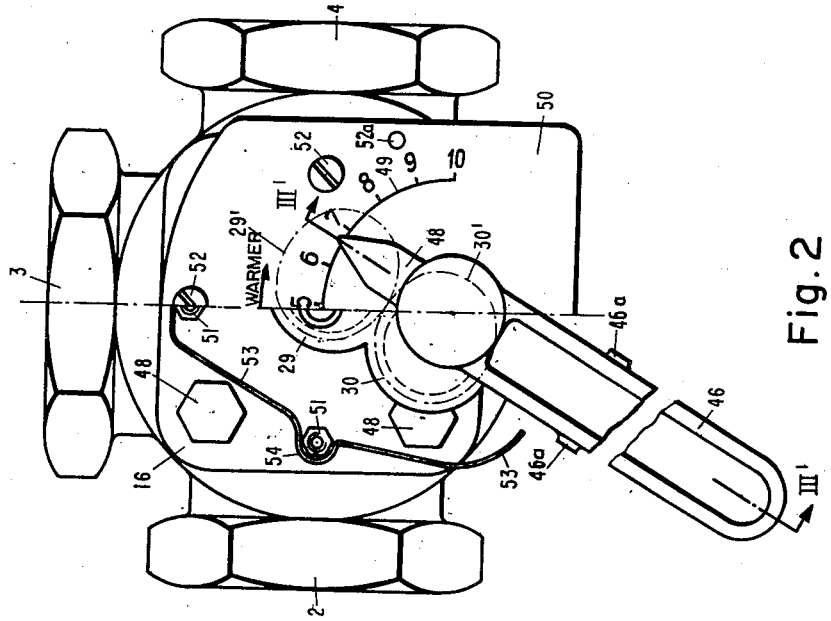
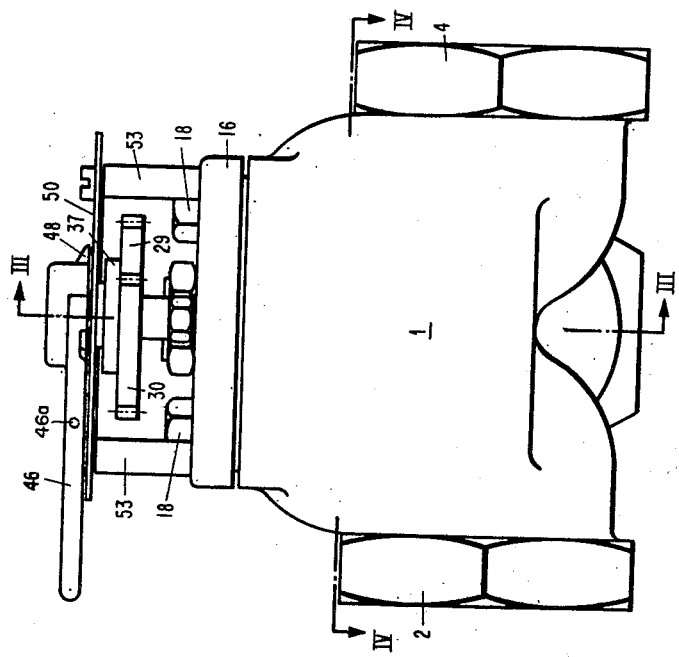
INVENTOR:
ROBERT FORSTER
By
Richardson, David and Nardon
ATTYS.

May 14, 1963 R. FORSTER 3,089,505
SLIDE TYPE MIXING VALVE WITH INTERCHANGEABLE
INLET AND OUTLET CONNECTIONS
Filed July 10, 1959 3 Sheets-Sheet 2
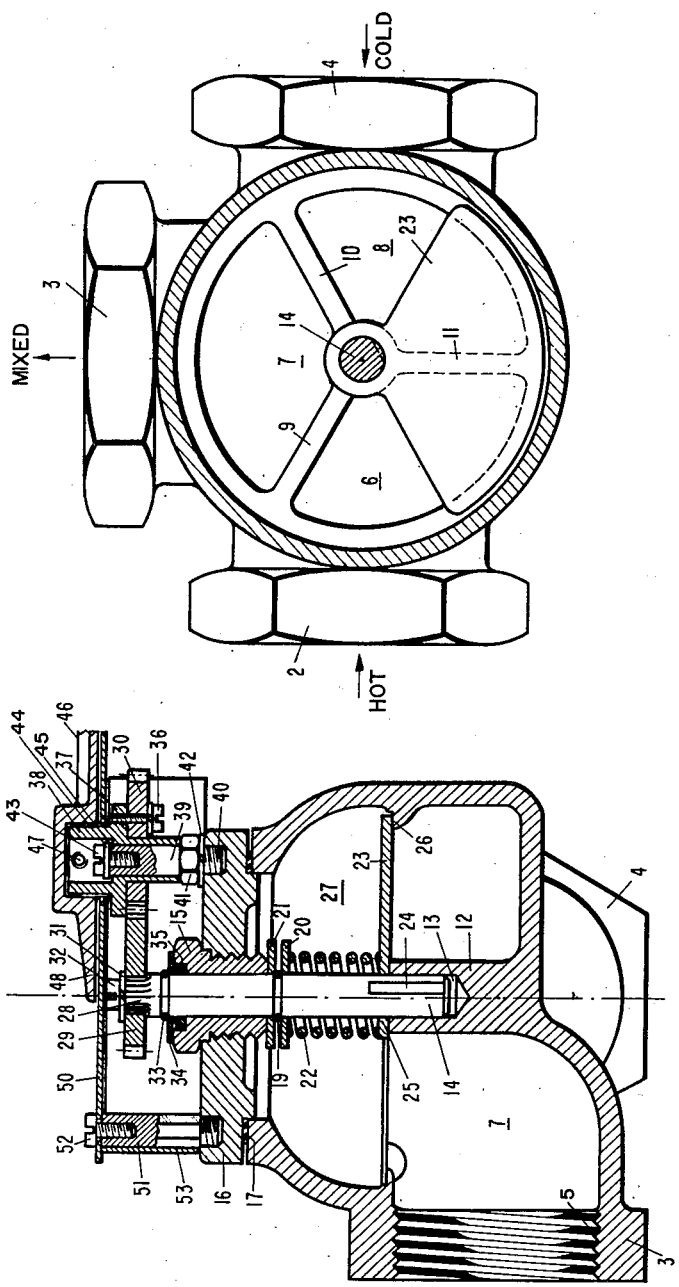
INVENTOR:
ROBERT FORSTER
By
Richardson, Davis and Nardon
ATTY'S.

May 14, 1963 R. FORSTER 3,089,505
SLIDE TYPE MIXING VALVE WITH INTERCHANGEABLE
INLET AND OUTLET CONNECTIONS
Filed July 10, 1959 3 Sheets-Sheet 3

*INVENTOR:*
*ROBERT FORSTER*
BY
*Richardson, David and Nardon*
ATT'YS

United States Patent Office 3,089,505
Patented May 14, 1963

3,089,505
SLIDE TYPE MIXING VALVE WITH INTERCHANGEABLE INLET AND OUTLET CONNECTIONS
Robert Forster, Winterthur, Switzerland, assignor to Sarco International Corporation, New York, N.Y.
Filed July 10, 1959, Ser. No. 826,282
Claims priority, application Switzerland July 17, 1958
7 Claims. (Cl. 137—270)

The present invention relates to a rotary three-way mixing valve, particularly suitable for central heating plants and has the main object of providing a three-way valve having inlet and outlet connections which can be used interchangeably without major structural alterations for many different pipe line configurations.

It is another object of the invention to provide a three-way valve of the kind referred to which can be used both as a "return flow admixer" and as a "return flow divider" for central heating plants.

With these and other objects in view, which will become apparent later from this specification and the accompanying drawings, I provide a rotary three-way mixing or slide valve, comprising in combination: a casing having three connector sockets arranged as a T, the axes of which lie in a common plane two of the axes being in alignment with one another and the third perpendicular to the aligned axes, a transfer chamber arranged in the casing and having three equal symmetrically arranged communication ports angularly spaced from each other by 120°, each port connecting one of the sockets individually with the transfer chamber, a sector-shaped valve plate member and a valve stem for rotating the valve plate member. The valve plate member is slidable through an angular range of 120° between any two adjacent ports to completely close either one of the ports accompanied by a full opening of the other port, the third port being permanently open. By changing the terminal positions of the 120° range of rotation, the valve plate member may be caused to slide over and regulate the flow distribution between any two adjacent ports without interfering with the third port which remains open and serves as a common inlet or common outlet, as desired. Gearing of non-uniform transmission ratio is provided between the valve control handle and the valve stem to provide 120° rotation of the valve stem for 180° rotation of the handle and to provide substantially uniformly spaced graduations on a calibrated scale associated with the control handle. The non-uniform ratio is obtained by the use of elliptical gearing one gear of which is splined to the valve stem to permit the pre-selection of any one of three separate 120° ranges of rotation for the valve stem by appropriate pre-assembly mounting of one of the gears on the valve stem.

Various objects, features and advantages of the invention will become apparent upon reading the following specification together with the accompanying drawing forming a part hereof.

Referring to the drawing:

FIGURE 1 is a side elevational view of a mixing valve embodying the invention.

FIGURE 2 is a front view of the valve shown in FIG. 1, the dial plate being partly broken away to illustrate details of construction.

FIGURE 3 is a sectional view in elevation taken along the line III'—III' of FIG. 2, looking in the direction of the arrows.

FIGURE 4 is a sectional view taken along the line IV—IV of FIG. 1 looking in the direction of the arrows.

Figure 6:
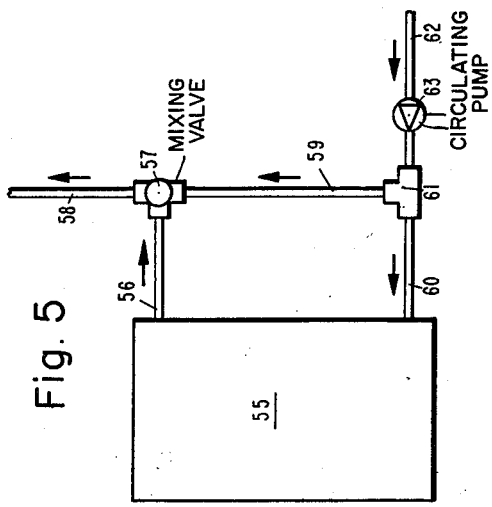
FIGURE 6 is similar to FIG. 5 with the valve arranged to divert cold return water either into the boiler or into the output piping in adjustable proportions, the valve having a single inlet and two outlets.

The mixing valve according to FIGS. 1 to 4 has a casing 1 with three connector sockets 2, 3 and 4, the axes of which lie in a common plane. These sockets are interiorly threaded as indicated at 5 (see FIG. 3). The socket 3 is offset 90° from each of the sockets 2 and 4, so that the axes of the sockets 2 and 4 are in alignment with one another. The sockets 2, 3 and 4 communicate separately with three connector chambers 6, 7 and 8, respectively (see FIG. 4), which are separated from one another by partitions 9, 10 and 11, at equal dihedral angles of 120° and standing perpendicular to the common plane containing the axes of the sockets 2 to 4.

The partitions 9 to 11 extend radially outwardly from a central boss 12 of the casing which is provided with an axial blind bore 13, wherein the lower end of a valve stem or spindle 14 is journalled. The upper end of spindle 14 is journalled in a bushing 15, which is screwed into a lid 16 of the casing. This lid 16 is removably secured to the casing 1 by means of screws 18, with a gasket 17 interposed.

In a circumferential groove formed on the spindle 14, a circular clip 19 is sprung, on opposite sides of which there are arranged washers 20 and 21. The washer 21 is subject to the bias of a spring 22, which bears upwardly against the washer 20 and clip 19, and is forced by the clip 19 against the bushing 15. On the spindle 14 a slider plate 23 is axially slidably mounted. The spindle 14 is provided with a milled flat 24 and the hole 25 of the plate 23, into which the spindle 14 is fitted, has a profile corresponding to this milled flat 24, so that the plate 23 rotates with the spindle 14. The spring 22 forces the plate 23 downwardly against an annular shoulder 26 of the casing, which together with the end faces of the partitions 9 to 11 and of the boss 12 of the casing lying in the same plane with this shoulder, provide a flat seat of the slider plate 23.

Above the slider plate 23 the casing 1 defines a chamber 27, through which liquid may be transferred from any of the three connector chambers 6 to 8 into any other of these chambers and which is accordingly referred to as a transfer chamber.

The upper end of the spindle 14 is provided with an external splining 28, diagrammatically indicated in FIG.

3 as consisting of twelve splines, which are accordingly at an angular pitch of 30°. On this splining 28 an elliptical gear 29 having an internal splining corresponding to the external splining 28 is mounted, the gear 29 being in mesh with another elliptical gear 30 of equal size. The mutually contacting "pitch-ellipses," corresponding to the pitch circles of the usual circular gear wheels, are denoted 29' and 30' in FIG. 2. A washer 31 and a screw 32 serve for securing the elliptical gear 29 on the spindle 14.

A further circular clip 33 is sprung on the spindle 14 and a washer 34 interposed between said clip and the bushing 15 retains a packing 35 lying in a recess of the bushing 15.

The gear 30 is fixedly connected to a flange 37 of a bushing 38 by means of screws 36, of which one only is visible in FIG. 3. The lower part of the bushing 38 is journalled on a pivot pin 39, which is provided with a screw thread 40 and with a hexagonal portion 41 lying above this screw thread. The pivot pin 39 is screwed by means of this screw thread 40 into the lid 16 of the casing. A lock washer therefor is denoted 42.

Into the upper end of the pivot pin 39 as screw 43 is tightly threaded, which retains a washer 44, the margin of which rests on a shoulder 45 of the bushing 38 and thereby secures the latter against axial upward movement on the pivot pin 39. A control handle 46 is fixed on the upper end of the bushing 38 by means of a set screw 47. The handle 46 is provided with a pointer tip 48, which when the handle is turned cooperates with an indicating scale displayed on a dial or scale plate 50, the left hand side half of which in FIG. 2 is broken away. On the right hand half of the scale plate 50 shown in FIG. 2 an arcuate arrow with the legend "Warmer" is provided, while on the left hand side an oppositely directed arcuate arrow (not shown) is denoted "Colder."

Three hexagonal spacer bolts 51 are screwed into the lid 16, and the scale plate 50 is fixed to these spacer bolts by means of three screws 52. A resilient curved screen 53, the width of which is equal to the length of the spacer bolts 51, is provided with two mutually opposite internal bulges 54 fitted over two of the spacer bolts 51. The four tapped holes in the lid 16 which receive the three spacer bolts 51 and the pivot pin 29, are of equal dimensions and lie 90° offset from one another on the same pitch circle concentric with the spindle 15. On the handle 46 two abutments 46a are provided which in conjunction with stops 52a (FIG. 2), only one being shown limit the angular travel of the handle 46 to a rotation of 180°.

The three-way slide valve described operates as follows:

Assuming the socket 2 to be connected to a hot water pipe and the socket 4 connected to a cold water pipe, and a pressure to prevail in both these pipes in excess of that prevailing in a pipe connected to the socket 3, then in the position of the slider disc illustrated in the drawing (see particularly FIG. 4) hot and cold water from the connector chambers 6 and 8, respectively, will mix in the transfer chamber 27 (see FIG. 3), will be transferred as a mixed water from there to the connector chamber 7, and flow out through the socket 3.

When then the handle 46 and accordingly the gear wheel 30 are turned clockwise in FIG. 2, the gear 29 on spindle rotates in the counter-clockwise sense and with it also the slider plate 23 rotates in the counter-clockwise sense as shown in FIG. 4. Consequently the clear area of the transfer port between the chambers 6 and 27 is enlarged, while on the other hand that between the chambers 8 and 27 is reduced, so that more of the hot water, and less of the cold water can get into the chamber 27, and the temperature of the mixed water rises.

Figure 5:
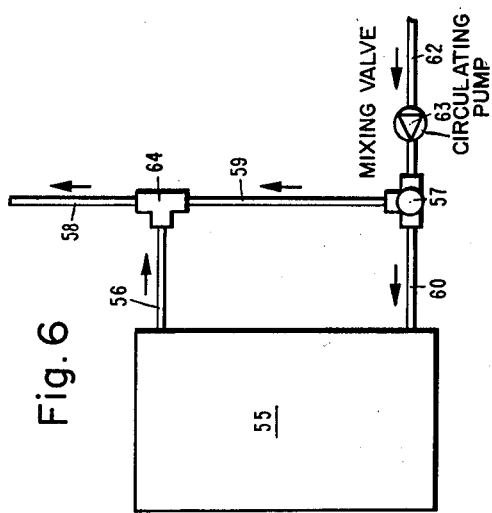
FIGURE 5 is a piping diagram which shows a valve in accordance with FIGS. 1-4 connected to mix cold return with hot output water from the boiler of a hot water heating system, the valve having two inlets and a single outlet.
Figure 10:
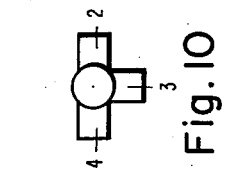
FIGURES 7 through 10 show the valve with the central connector directed toward the right, upwardly, leftwardly and downwardly, respectively, the valve being so assembled in each instance that the front view, except for the various different positions of the pipe connections, appears as shown in FIG. 2, with FIG. 2 corresponding to FIG. 8.
Figure 9:
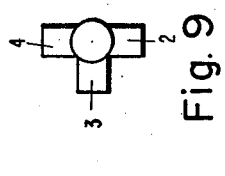
Figure 8:
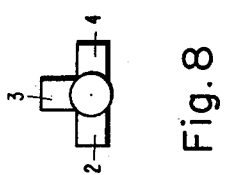
Figure 7:
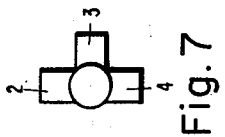

In order to explain the advantages of the three-way slide valve illustrated, it is necessary to refer in more detail to its application contemplated:

In FIG. 5 a central heating boiler is denoted 55, the outflow connector pipe 56 of which is connected by the three-way slide valve designated generally as 57 on the one hand to the outflow pipe 58 and on the other hand to an admixing or by-pass pipe 59. The return flow-connector pipe 60 is connected through a T 61 on the one hand to the main return flow pipe 62 and on the other hand to the said admixing or by-pass pipe 59. In the return flow pipe 62 a circulation pump 63 is inserted. In this application hot water coming from the boiler 55 is mixed in the slide valve 57 with comparatively cold return flow water, and the mixed water is supplied to the outflow pipe 58.

The application of the three-way slide valve 57 illustrated in FIG. 6 is distinguished from that shown in FIG. 5 in that the main return flow pipe 62 is connected by the slide valve 57 on the one hand to the return flow connector pipe 60 and on the other hand to the by-pass pipe 59, while the outflow connector pipe 56 is connected by a T 64 to the outflow pipe 58 and to the by-pass pipe 59. In this case in the side valve 59 there is no mixing of two flows but an adjustable division of the flow coming from the return flow pipe 62 is effected. The comparatively cold water coming from the admixing pipe 59 mixes in the T-piece 64 with the hot water coming from the out flow connector pipe 56, and the mixed water flows into the outflow pipe 58.

These two applications of a three-way valve are conventional. In the case of FIG. 5 the slide valve is said to serve as a "return flow admixer" and in the case of FIG. 6 as a "return flow divider."

When installing central heating plants, the connections to the boiler, the outflow pipe and the return flow pipe are by no means always so positioned that they can be connected in any case to one and the same three-way slide valve without complicated fitting of connector pieces, particularly of connector bends to one another and to the admixing pipe. Consequently it is necessary to provide several types of three-way slide valves, the connector sockets of which are arranged to fit the various installation requirements arising in practice.

The three-way slide valve illustrated in FIGS. 1 to 4, because of the perfect symmetry of the communication ports controlled by the slider plate 23, permits the connection of any desired socket 2, 3 or 4 to any desired pipe 56, 48, 59, 60 or 62. Four normal positions are provided for the slide valve, as illustrated in FIGS. 7 to 10. The plane, in which the axes of the three sockets lie, i.e. the plane of the drawing in FIGS. 7 to 10, is preferably chosen vertical, but could alternatively be horizontal or inclined. Since in any one of the four normal positions shown the three connector pipes could be associated with the sockets 2, 3 and 4 in six different ways, a total of twenty four different possible connections results.

Depending on the case of the possible connections actually chosen:

(1) the elliptical gear wheel 29 is fitted to the splining 28 in the desired angular position;

(2) the pivot pin 39 and the spacer bolts 51 are screwed into the lid 16 in the desired positions, care being taken that the scale plate 50 is arranged in the upright position illustrated in FIG. 2, if this plate is to be vertical.

Since the splining 28 in which the gear 29 is fitted, has twelve spline ridges it appears at first as if only twelve different positions of this gear would be possible relative to the slider plate 23, the position of the latter being positively determined relative to the spindle 14 because of the milled flat 24. However the internal splining of the gear wheel 29 to be fitted to the splining 28 is not laid out symmetrically with respect to the two geometrical axes of the ellipse, so that by reversing the gear wheel 29, i.e. by turning its end face lying on top in FIG. 3 to the bottom and fitting the gear wheel in this reversed position to the splines 28, twelve further positions, and accordingly a total of twenty four different positions of the gear wheel 29 relative to the slider plate 23 are attained.

The reason for using elliptical gear wheels 29, 30 and not ordinary circular gear wheels, or for not fitting the handle 46 directly to the spindle 14 is as follows:

It is desirable that upon turning the handle 46 the temperature of the mixed water should increase approximately in linear proportion to the angular displacement of the handle. Detailed investigations have, however, shown that assuming a circular sector shape of the slider plate 23, the temperature of the mixed water would by no means increase in linear relation to the angle of rotation of the spindle 14. It is known, that elliptic gear wheels of equal size mounted each on an axis passing through one focal point of the ellipse, and with the spacing of the two axes of rotation being equal to the larger geometrical axis of the ellipse, keep constantly in mesh with one another and effect a non-uniform rotation of one gear wheel upon a uniform rotation of the other gear wheel. When the handle 46 is turned uniformly through an angle of 180°, so that the pointer tip 48 is turned from the graduation "0" (not shown) to the graduation "10" of the scale, the slider plate 23 is turned from a position, in which it lies firstly entirely above the chamber 6, initially slowly and then gradually faster through 120° into a position in which it finally lies entirely above the chamber 7. As a consequence of the varying transmission ratio of the pair of gear wheels 29, 30 which changes with the angular position of the handle 46 and spindle 14, respectively, an approximately linear increase of the temperature of the mixed water as a function of the angle of rotation of the handle is attained by suitable selection of the ratio of the geometrical axes of the ellipses and of the angular offset of the internal splining of the gear wheel 29 relative to these axes of the ellipse. The ratio of the geometrical axes of the ellipses 29' and 30' is for example approximately 0.85 and the said angular offset 120.

When interchanging the hot water- and cold water-connections in the same normal position of the slide valve, the gear wheel 29 is to be reversed as explained hereinabove, the angular offset then coming to lie on the other side of the crossed geometrical axes of the ellipse. Moreover the gear wheel 30 is to be reversed and to be fitted to the flange 37 of the bushing 38 in a position turned 120°. Likewise the scale plate 50 is to be reversed, the lower face of which is provided with a scale in which the numbering and the notation of the scales is the reverse of that of the scale 49. One then obtains a configuration of mirror symmetry about the centre line as compared with the configuration of FIG. 3, so that upon uniform rotation of the handle 46 from "0" to "10" in the counterclockwise direction the spindle 14 turns firstly faster and then more slowly.

The gear wheels 29 and 30 as well as the splining on the upper end of the spindle 14 are preferably provided with markings, in order to be able to fit them without difficulty according to the instruction manual in accordance with the actual cases of installation arising as explained hereinabove.

While I have described herein and illustrated in the accompanying drawings what may be considered typical and particularly useful embodiments of my said invention I wish it to be understood that I do not limit myself to the particular details and dimensions described and illustrated, for obvious modifications will occur to a person skilled in the art.

What I claim as my invention and desire to secure by Letters Patent, is:

1. A rotary three-way slide valve comprising, in combination: a casing having three connector sockets the axes of which lie in a common plane, two of said axes being in alignment with one another and the third axis being perpendicular to the first two axes, a transfer chamber arranged in said casing and having three equal communication ports mutually offset 120°, each port connecting one of said sockets with said transfer chamber, a slider plate rotatably mounted in said casing between said sockets and said transfer chamber and controlling the flow through the said ports, an annular shoulder formed in said casing, said casing having a central internal boss and three partitions radiating from said boss at angles of 120°, said shoulder, said boss and said partitions defining said ports, said partitions and said casing forming connector chambers each communicating with said transfer chamber through one of said ports, said ports lying between said transfer chamber and said connector chambers and each being sector-shaped, said slider plate having the shape of a 120° circular sector, a spindle rotatably mounted in said boss, said plate being slidably mounted on and coupled for rotation with said spindle, and a compression spring surrounding said spindle and biasing said plate against said partitions and against said shoulder, said slider plate being operative to open one port of a pair while simultaneously closing the other, and mechanism for adjusting the rotational range of said slider plate with respect to a given angular displacement of said spindle for selectively controlling the opening and closing of any pair of the three individual pairs of said ports.

2. A rotary three-way slide valve comprising, in combination: a casing having three connector sockets the axes of which lie in a common plane, two of said axes being in alignment with one another and the third axis being perpendicular to the first two axes, a transfer chamber arranged in said casing and having three equal communication ports mutually offset 120°, each port connecting one of said sockets with said transfer chamber, a slider plate rotatably mounted in said casing between said sockets and said transfer chamber and controlling the flow through the said ports, an annular shoulder formed in said casing, said casing having a central inner boss and three partitions radiating from said boss at angles of 120°, said shoulder, said boss and said partitions defining said ports, said partitions and said casing forming connector chambers each communicating with said transfer chamber through one of said ports, said ports lying between said transfer chamber and said connector chambers and each being sector-shaped, said slider plate having the shape of a 120° circular sector, a spindle rotatably mounted in said boss, said plate being slidably mounted on and coupled for rotation with said spindle, a compression spring surrounding said spindle and biasing said plate against said partitions and against said shoulder, said slider plate being operative to open one port of a pair while simultaneously closing the other, and mechanism for adjusting the rotational range of said slider plate with respect to a given angular displacement of said spindle for selectively controlling the opening and closing of any pair of the three individual pairs of said ports, a control member, and a varying transmission ratio coupling mechanism kinematically coupling said control member to said spindle.

3. A valve according to claim 2, wherein said coupling mechanism includes two elliptical gear members of equal dimensions in meshing engagement with each other.

4. A valve according to claim 3, wherein said spindle has splining formed thereon, said splining engaging one of said gear members, said splining providing a plurality of different angular positions for assembly of said one gear member on said spindle with respect to said slider plate, and means on said casing for supporting the other gear member, said control member being connected to said other gear member.

5. A valve according to claim 4, wherein said splining is offset at an angle with respect to the geometrical axes of said one gear member to provide a second plurality of different angular positions of assembly of said one gear member on said spindle by inverting said one gear member.

6. A valve according to claim 1, further comprising a control handle connected to cause rotation of said spindle, a dial plate cooperating with said handle for indicating the position thereof, means limiting the range of movement of said control handle, and means for mounting said dial plate on said casing in a plurality of different positions in accordance with said range of movement.

7. A valve according to claim 6 further comprising elliptical gearing interconnecting said control handle and said spindle, said gearing providing a predetermined relationship between the position of said handle as indicated by said dial plate and the operational effect of the resulting position of said slider plate.

References Cited in the file of this patent

UNITED STATES PATENTS 2,147,591  Barnes ---------------- Feb. 14, 1939

FOREIGN PATENTS 319,098  Germany ------------------ of 1920
590,225  Great Britain ------------------ 1947